US008326978B2

(12) United States Patent
Bharadwaj et al.

(10) Patent No.: US 8,326,978 B2
(45) Date of Patent: Dec. 4, 2012

(54) AUTOMATIC UPDATES TO FABRIC ALERT DEFINITIONS FOR FABRIC SEGMENTATION, FABRIC MERGE, AND FABRIC PRINCIPAL SWITCH CHANGES

(75) Inventors: Sunil Bharadwaj, Beaverton, OR (US); Stephen A. Byrd, San Jose, CA (US); David L. Merbach, Rochester, MN (US); Kevin J. Webster, Lake Worth, FL (US); Li Zhou, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 482 days.

(21) Appl. No.: 12/701,137

(22) Filed: Feb. 5, 2010

(65) Prior Publication Data

US 2011/0196958 A1 Aug. 11, 2011

(51) Int. Cl.
*G06F 15/173* (2006.01)
(52) U.S. Cl. ......................... 709/224; 709/223
(58) Field of Classification Search .................... 709/224
See application file for complete search history.

(56) References Cited

U.S. PATENT DOCUMENTS

| 7,194,538 | B1 * | 3/2007 | Rabe et al. | 709/224 |
| 7,203,730 | B1 * | 4/2007 | Meyer et al. | 709/213 |
| 7,370,323 | B2 * | 5/2008 | Marinelli et al. | 717/173 |
| 7,397,768 | B1 | 7/2008 | Betker | |
| 7,676,836 | B2 * | 3/2010 | Prigent et al. | 726/11 |
| 7,810,151 | B1 * | 10/2010 | Guruswamy | 726/13 |
| 7,885,256 | B1 * | 2/2011 | Yenamandra et al. | 370/389 |
| 2009/0024734 | A1 | 1/2009 | Merbach et al. | |
| 2009/0219827 | A1 * | 9/2009 | Chen et al. | 370/252 |

FOREIGN PATENT DOCUMENTS

EP 1324172 7/2003

OTHER PUBLICATIONS

"Managing a Fibre Channel Storage Area Network", Storage Networking Industry Association, A white paper on Fibre Channel Storage Area Network by the Fibre Channel Storage Network Management Working Group, http://www.esicomputing.com/documents/tp-SAN.pdf, Nov. 20, 1998.
"HP Storage Works Fabric Interoperability: Merging Fabrics Based on M-Series and B-Series Fibre Channel Switches Application Notes", Hewlett-Packard Development Company, Application notes on best practices for implementing Storage Area Network (SAN), http://bizsupport2.austin.hp.com/bc/docs/support/SupportManual/c00100962/c00100962.pdf, Dec. 2008.

* cited by examiner

*Primary Examiner* — Christopher Biagini
(74) *Attorney, Agent, or Firm* — Kunzler Law Group, PC

(57) ABSTRACT

The present disclosure provides techniques for updating fabric alert definitions defined for a fiber channel or other fabric-based network within a storage management system. One embodiment provides techniques for detecting fabric merges, fabric segmentations, and principal switch changes of the fabric and modifying fabric alert definitions as a result of these changes. Thus, any alert definitions scoped by fabric will remain relevant even after fabric structural changes, and duplicate and/or redundant alerts may be reduced within the storage management system. In a further embodiment, detection of fabric changes is performed by first storing relationships between fabrics and switches, and comparing the current relationships between the fabrics and the switches against the stored relationships. Upon recognition of changes within the fabrics, the fabric alert definitions may be automatically analyzed and updated.

20 Claims, 7 Drawing Sheets

Alert Definition 1:
Fabric WWN 100000051E34AAAA

Alert Definition 2: — 411
Fabric WWN 100000051E34AEEE

421 —— ⬇ Merger of 'AAAA and 'AEEE Fabrics

'AAAA Fabric becomes principal switch in merged fabrics

Alert Definition 1:
Fabric WWN 100000051E34AAAA

Alert Definition 2: — 431
Fabric WWN 100000051E34AAAA

441 —— ⬇ Logically Compare Alert Definitions

Identify and Respond to Redundant Alert Definitions

Alert Definition 1:
Fabric WWN 100000051E34AAAA — 451

Fig. 4A

Alert Definition 1:
Fabric WWN 100000051E34AAAA
Fabric WWN 100000051E34ABBB

Alert Definition 2:
Fabric WWN 100000051E34ADDD
Fabric WWN 100000051E34AEEE

— 412

422 —

Merger of 'AAAA and 'AEEE Fabrics

'AEEE Fabric becomes principal switch in merged fabrics

Alert Definition 1:
Fabric WWN 100000051E34ABBB
Fabric WWN 100000051E34AEEE

Alert Definition 2:
Fabric WWN 100000051E34ADDD
Fabric WWN 100000051E34AEEE

— 432

442 —

Logically Compare Alert Definitions

Identify and Respond to Redundant Alert Definitions

Alert Definition 1:
Fabric WWN 100000051E34ABBB
Fabric WWN 100000051E34AEEE — 452

Alert Definition 2:
Fabric WWN 100000051E34ADDD

Fig. 4B

Alert Definition 1:
Fabric WWN 100000051E34AAAA
Fabric WWN 100000051E34BBBB
— 413

Alert Definition 2:
Fabric WWN 100000051E34AEEE

423 —

Merger of 'AAAA and 'AEEE Fabrics

'AEEE Fabric becomes principal switch in merged fabrics

Alert Definition 1:
Fabric WWN 100000051E34ABBB
Fabric WWN 100000051E34AEEE
— 433

Alert Definition 2:
Fabric WWN 100000051E34AEEE

443 —

Logically Compare Alert Definitions

Identify and Respond to Redundant Alert Definitions

Alert Definition 1:
Fabric WWN 100000051E34ABBB
Fabric WWN 100000051E34AEEE — 453

Fig. 4C

AUTOMATIC UPDATES TO FABRIC ALERT DEFINITIONS FOR FABRIC SEGMENTATION, FABRIC MERGE, AND FABRIC PRINCIPAL SWITCH CHANGES

FIELD OF THE INVENTION

The present invention relates generally to data communications in storage area networks. The present invention is more specifically directed to the use and management of alert definitions configured for monitoring conditions occurring in storage area network fabrics.

BACKGROUND OF THE INVENTION

Fibre channel (FC) storage area networks (SANs) may be configured to provide a network topology having a plurality of "fabrics." Fabrics are comprised of one or more fibre channel switches that allow endpoint devices ("nodes") connected to each other to communicate via the switched network. Within the fabric, the fibre channel switches are also connected to each other through inter-switch link cable connections between ports on a first switch to ports on a second switch. Multiple fabrics are used within typical SAN configurations to produce redundancy in case of failure of portions of the FC network, such as when inter-switch links are broken within the fabric or network communications are otherwise interrupted.

Storage management applications are used by storage administrators for many aspects of managing FC fabric configurations, including receiving alerts (such as by sending automatic emails) when fabric events occur. Examples of fabric events that the administrator may receive alerts for include: when the endpoint on a fabric has gone missing; when the endpoint on a fabric has been discovered or re-discovered; when a new zone has been created in a fabric's zoning database; and when an existing zone has been removed from a fabric's zoning database.

Some storage resource management products, such as IBM TIVOLI® Storage Productivity Center, allow users to create an alert definition whose scope is for one or more fabrics selected from a larger set of fabrics. For example, the Administrator could define an alert definition such as to receive alerts when any endpoint on Fabric 100000051E34AE1C has gone missing. Rather than needing to run and analyze reports, the user may look at the alert log to easily determine what is happening in the fabric in real-time.

A fabric, however, is simply a logical entity—a collection of connected fibre channel switches. The set of switches within a fabric can change. A fabric can split or become segmented. Two fabrics can merge. A switch from one fabric can be moved to another fabric. As a further complexity, the world wide name (WWN) of the principal switch of a fabric is commonly used as the unique identifier of the fabric in FC networks by storage resource management products. Thus, when the principal switch of the fabric changes, the unique identifier for the fabric is changed.

Because the set of switches in a fabric and/or the identifier of the fabric may change, the Storage Administrator may have previously configured an alert definition for a fabric that becomes meaningless. For example, if the Storage Administrator had created an alert definition to receive alerts when any endpoint on Fabric 100000051E34AE1C has gone missing, and then the principal switch in the fabric changes, this causes the fabric identifier to change. The previous alert definition for Fabric 100000051E34AE1C will be configured to provide alerts for a fabric identifier that no longer exists. In this scenario, the Storage Administrator will no longer receive alerts when any endpoints go missing, even though the only change that occurred was a change of principal switch for the fabric.

There are no known solutions to comprehensively address the alert definition problems described above, except to prevent alert definitions from being selected and scoped by fabric. The various embodiments of the present invention address these problems by introducing multiple approaches to fabric monitoring and fabric alert changes.

BRIEF SUMMARY OF THE INVENTION

One aspect of the present invention solves the aforementioned problems of outdated and invalid fabric alert definitions used within storage management software applications by detecting fabric merges, fabric segmentations, and principal switch changes of a fabric relevant to alert definitions. Further, another aspect of the present invention provides functionality for automatically modifying fabric alert definitions as appropriate to ensure accuracy and correct operation of the alert definitions.

The various embodiments of the present invention are able to solve two important and related problems in use of fabric alerts. First, storage management software applications will be enabled to keep alert definitions relevant even after fabric structural changes such as a fabric name change. In addition, duplicate alerts may be reduced within the storage management software application through use of techniques that recognize and remove redundant alert definitions.

In one embodiment of the present invention, relationships between each fabric and the switches in the fabric are stored and maintained in a computer generated list. When the appropriate storage management software application runs a "discovery job" to collect the current relationships between fabrics and switches in the storage management system, it compares the previously known fabric-to-switch relationships to the current fabric-to-switch relationships. If the fabric-to-switch relationships have changed, then the alert definitions are updated as appropriate to add a fabric, remove a fabric, or replace a fabric in the set of fabrics referenced by the various alert definitions.

Further embodiments of the present invention also provide functionality for managing relationships between fabrics in the event of fabric mergers. Therefore, if two merged fabrics are listed in either the same or separate fabric alert definitions, then these embodiments operate to remove references to the old and/or redundant fabric. Additionally, further embodiments provide warnings to the system administrator upon recognition and/or removal of such redundant alert definitions.

In one embodiment of the present invention, a method for performing automatic updates to fabric alert definitions operates within a storage management system, with the storage management system configured to manage a storage area network having a plurality of switches and a plurality of fabrics defined among these switches. In this method, fabric alert definitions are provided within the storage management system for generating alerts relevant to fabric-related events. The detection step is facilitated by storing relationships between fabrics and switches within the plurality of fabrics, and then detecting changes to changed fabrics by comparing the relationship between the fabrics and the switches against the stored relationships. Upon recognition of changes within the fabrics, the fabric alert definitions are automatically updated.

As previously disclosed, some of the changes handled by this embodiment of the present invention include the addition of a new switch to a fabric that results in this fabric's identifier referencing the new switch; the segmentation of a first fabric into a second and a third fabric; the movement of a switch from a first fabric to a second fabric; a merger of a first fabric and a second fabric; and a change of the principal switch of the fabric. Each of these cases are handled in detail by the present invention to automatically modify the affected fabric alert definitions and replace references to old fabrics and old fabric identifiers with references to new fabrics and/or new fabric identifiers as applicable.

Another embodiment of the present invention provides for a storage management system comprising a processor, a memory unit, and instructions stored within the memory unit for performing automatic updates to fabric alert definitions within the storage management system to implement the techniques as described above. Additionally, another embodiment of the present invention provides for a computer program product for performing automatic updates to fabric alert definitions, with the computer program product comprising a computer readable storage medium having computer readable program code embodied therewith to implement the techniques described above.

BRIEF DESCRIPTION OF THE DRAWINGS

FIG. 4A depicts an example scenario of updating fabric alert definitions in response to a fabric merger according to one embodiment of the present invention;

FIG. 4B depicts another example scenario of updating fabric alert definitions in response to a fabric merger according to one embodiment of the present invention; and FIG. 4C depicts still another example scenario of updating fabric alert definitions in response to a fabric merger according to one embodiment of the present invention.

DETAILED DESCRIPTION OF THE INVENTION

The various aspects of the present invention provide functionality to provide changes to alert definitions that are required as a result of fabric changes within a storage area network (SAN). Specifically, the present disclosure describes embodiments that monitor events relevant to alert definitions including mergers of fabrics, segmentations of fabrics, and principal switch changes within fabrics. These embodiments are able to respond to and update alert definitions referencing the various fabric(s) as a result of these events. Thus, the various alert definitions that are created by storage administrators to correspond to specific fabrics can be kept in an accurate and relevant state.

Figure 1A:
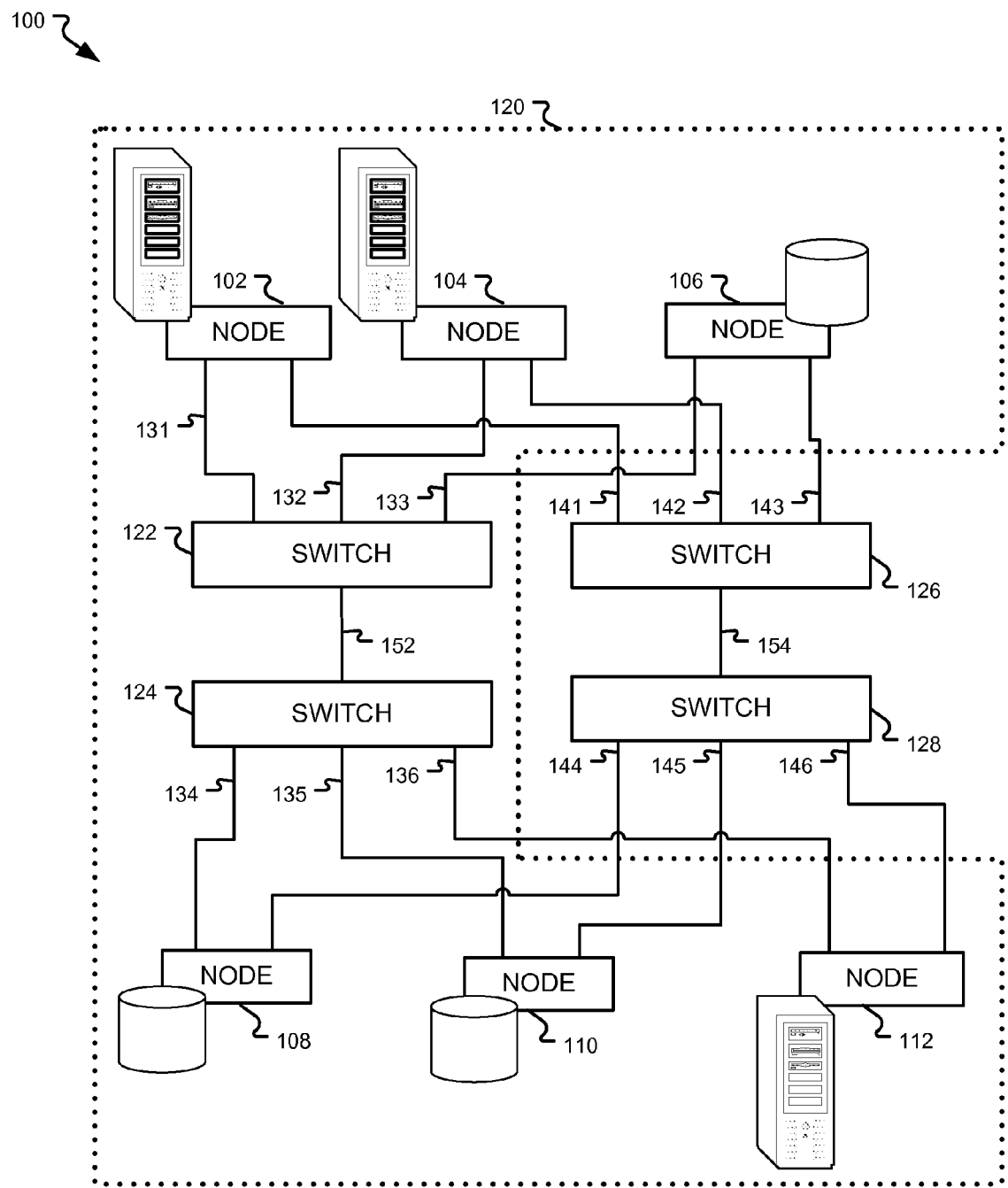
FIGS. 1A and 1B depict an example configuration of a storage area network and two fabrics in which the various embodiments of the present invention may be implemented.
Figure 1B:
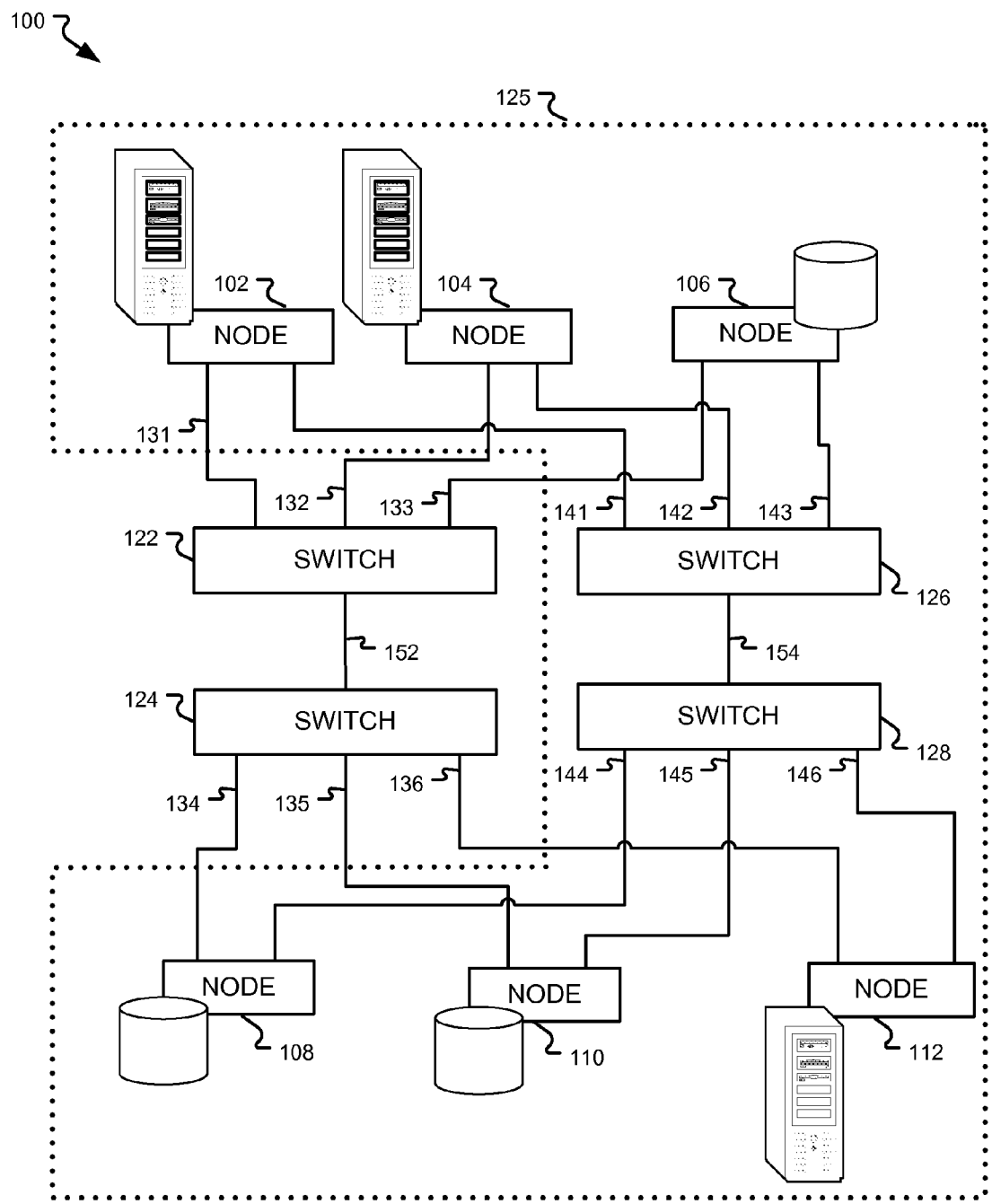

FIGS. 1A-1B depict an example storage area network in which aspects of the various embodiments of the present invention may be implemented. The SAN 100 depicted within FIGS. 1A-1B illustrates a network of interconnected computing devices, storage devices, and networking devices. Specifically, SAN 100 contains a plurality of nodes 102, 104, 106, 108, 110, 112. These nodes may be hosts that access storage capabilities of the SAN, or the nodes may be storage subsystems used to provide the data storage capabilities of the SAN. For example, as shown in FIGS. 1A-1B, these nodes include storage units 106, 108, and 110, in addition to computing systems 102, 104, and 112.

As illustrated in FIG. 1A, the switched network existing between the plurality of nodes within the SAN 100 is configured with a first fabric 120. A fabric is inclusive of the nodes as well as the switched network connected to the nodes, with the SAN being the larger collection of one or more fabrics and the entire network configuration. Therefore, in FIG. 1A, the fabric 120 includes all nodes connected within the SAN 100, in addition to a plurality of switches (122 and 124) within the SAN 100. As shown within fabric 120, switches 122 and 124 are connected to the various network nodes via connections 131, 132, 133, 134, 135, 136 to create a network having a line topology network with no redundancy in fabric connections (with switches 122 and 124 directly connected though an inter switch link 152).

FIG. 1B depicts a configuration of the identical SAN 100, but with an illustration of the second fabric 125 containing switches 126 and 128. Thus, the second fabric 125 also covers the network nodes 102, 104, 106, 108, 110, 112, but via connections 141, 142, 143, 144, 145, 146 through switches 126 and 128 (with switches 126 and 128 directly connected through an inter switch link 154).

Although only two fabrics are shown within SAN 100 in FIGS. 1A and 1B, those skilled in the art would recognize that numerous fabrics may be configured within storage area networks of varying sizes. Likewise, the configuration of the SAN may differ such as by creating additional inter switch links between switches in the SAN to create a partially or fully connected mesh topology.

In one embodiment of the present invention, the connections within SAN 100 are fibre channel connections, and the switches 122, 124, 126, 128 are fibre channel switches. In alternative embodiments, the network type used within SAN 100 may be serial attached SCSI (SAS), iSCSI, Fibre Channel over Ethernet (FCoE), or other suitable storage area network data transfer technologies. Thus, the storage devices, switches, and subsystems connected to the fabrics within the SAN may be fibre channel storage devices, SAS storage devices, single storage devices, or other combinations of storage devices and enclosures operable within the appropriate network topology. The following disclosure will generally refer to the fibre channel topology due to its prevalent usage in storage area networks, although those skilled in the art will recognize that the present invention is equally applicable to other network protocols and technologies.

In operation of the SAN 100, various changes may occur to the fabrics. For example, the second fabric 125 that includes switches 126 and 128 may merge with the first fabric 120 that includes switches 122 and 124, to produce a fabric having all four switches. Fabric segmentations may occur that splits the first fabric 120 containing switches 122, 124 into a fabric containing switch 122 and a fabric containing switch 124. The principal switch of the fabric may also change, such as in the case that switch 122 that was previously the principal switch of fabric 120 is replaced by switch 124 as the principal switch (thus changing the WWN of the fabric 120 from switch 122 to switch 124).

As part of the storage management system software that manages operation of the SAN 100, various alerts may be configured to notify administrators of an alert condition. These alert definitions may be configured to send an alert notification upon the occurrence of defined alert conditions throughout the storage management system, including storage subsystems, computers, file systems, directories, fabrics, switches, or endpoint devices connected to the node.

As previously described, if certain characteristics of the fabric change, such as the WWN used to identify the fabric, the fabric alert definitions will become outdated or redundant. To address this problem, the present invention implements a number of techniques for detecting fabric changes relevant to existing alert definitions. Additionally, another aspect of the present invention provides functionality for automatically modifying the fabric alert definitions as appropriate to respond to removed or merged fabrics.

Figure 2:
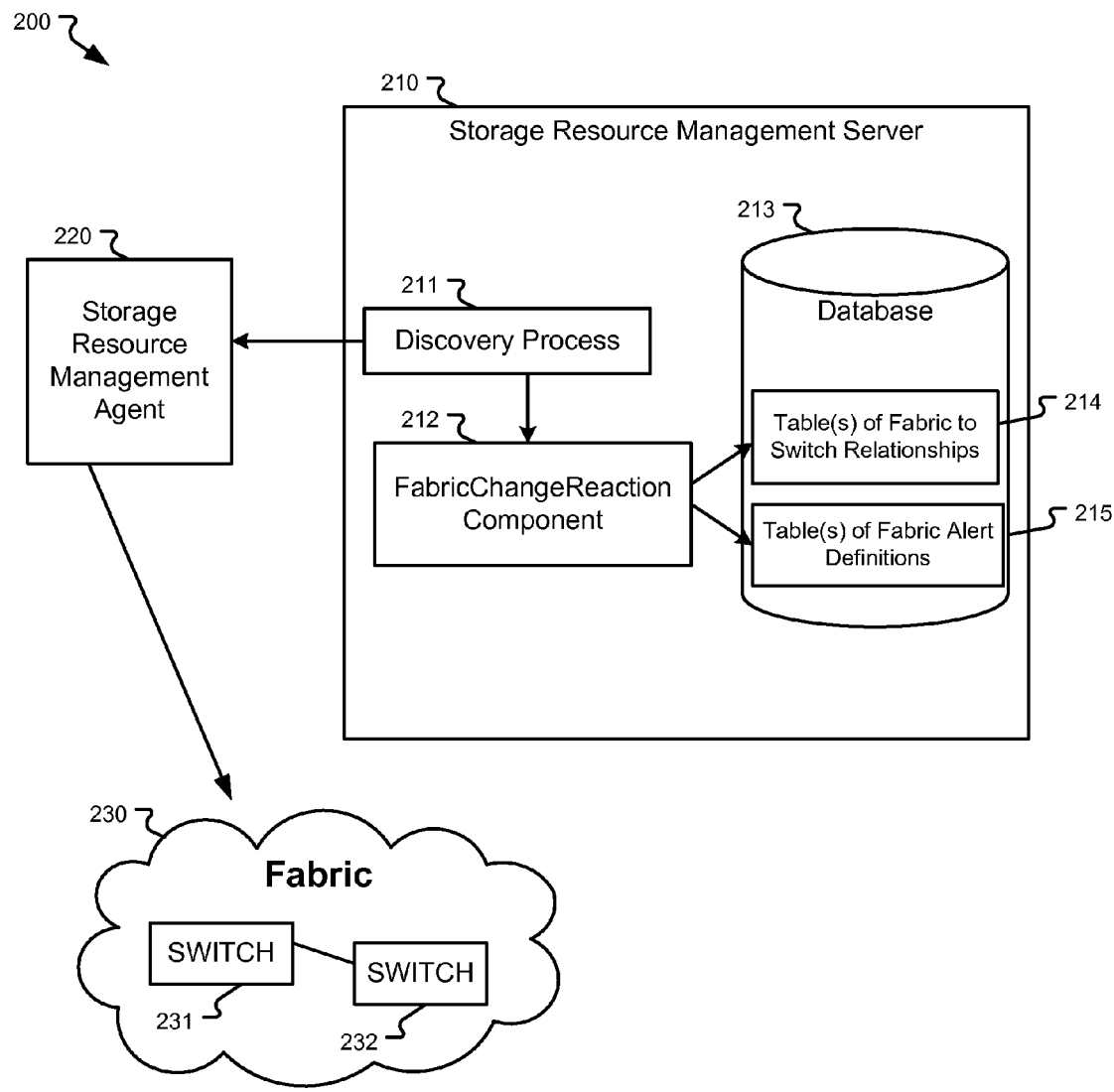
FIG. 2 depicts an example configuration of storage management system components used to detect and respond to fabric changes in a storage area network according to one embodiment of the present invention.

FIG. 2 depicts a configuration of selected components used in a storage management system 200 to implement the various fabric alert definition changes according to one embodiment of the present invention. As those skilled in the art would recognize, the following components may be implemented through an appropriate mixture of hardware and software features operating within the storage management system.

In this embodiment, the Storage Resource Management Server 210 is structured to include the sub-components DiscoveryProcess 211, FabricChangeReaction Component 212, and a database 213. The Storage Resource Management Agent 220 operates within the storage management system to collect on demand the latest fabric-to-switch relationships from the switches, such as switches 231 and 232 within fabric 230. In an alternative embodiment, the Storage Resource Management Agent may be embedded on the switch itself such as an SNMP Service which provides one or more management information base (MIB).

The DiscoveryProcess component 211 operates to retrieve the latest fabric-to-switch relationships from the Storage Resource Management Agent 220 and pass this information to the FabricChangeReaction Component 212. The DiscoveryProcess 211 may collect other attributes of the fabric and persist this information into the database. The DiscoveryProcess 211 may be triggered on a regularly scheduled basis. Or, the DiscoveryProcess 211 may be triggered automatically when a fabric event occurs (such as a segmentation event, merge event, or principal switch change event).

Additionally, the FabricChangeReaction Component 212 operates to retrieve the previously known fabric-to-switch relationships stored in a fabric-to-switch relationship database 214, and compare the stored relationships to the current fabric-to-switch relationship. From this, the component can easily determine whether any fabric merges, fabric segmentations, or principal switch changes have occurred. Finally, based on the discovered changes, the FabricChangeReaction component implements the necessary updates to the database table(s) which hold the Fabric Alert Definitions 215, or otherwise triggers a process which performs such updates to the alert definitions.

As suggested above, the DiscoveryProcess 211 may operate asynchronously, i.e., from activities occurring within the fibre channel switch itself. Alternatively, changes may be discovered as a result of a network probe that operates at a repeated interval, such as nightly.

Other components may be used in conjunction with the detection and change response techniques described above. For example, a graphical user interface (GUI) may be provided to a user to manually view and edit alert definitions. Those skilled in the art would recognize that other types of utilities and interface subsystems may be integrated within a software management system to allow greater control and customization for system administrators.

Figure 3:
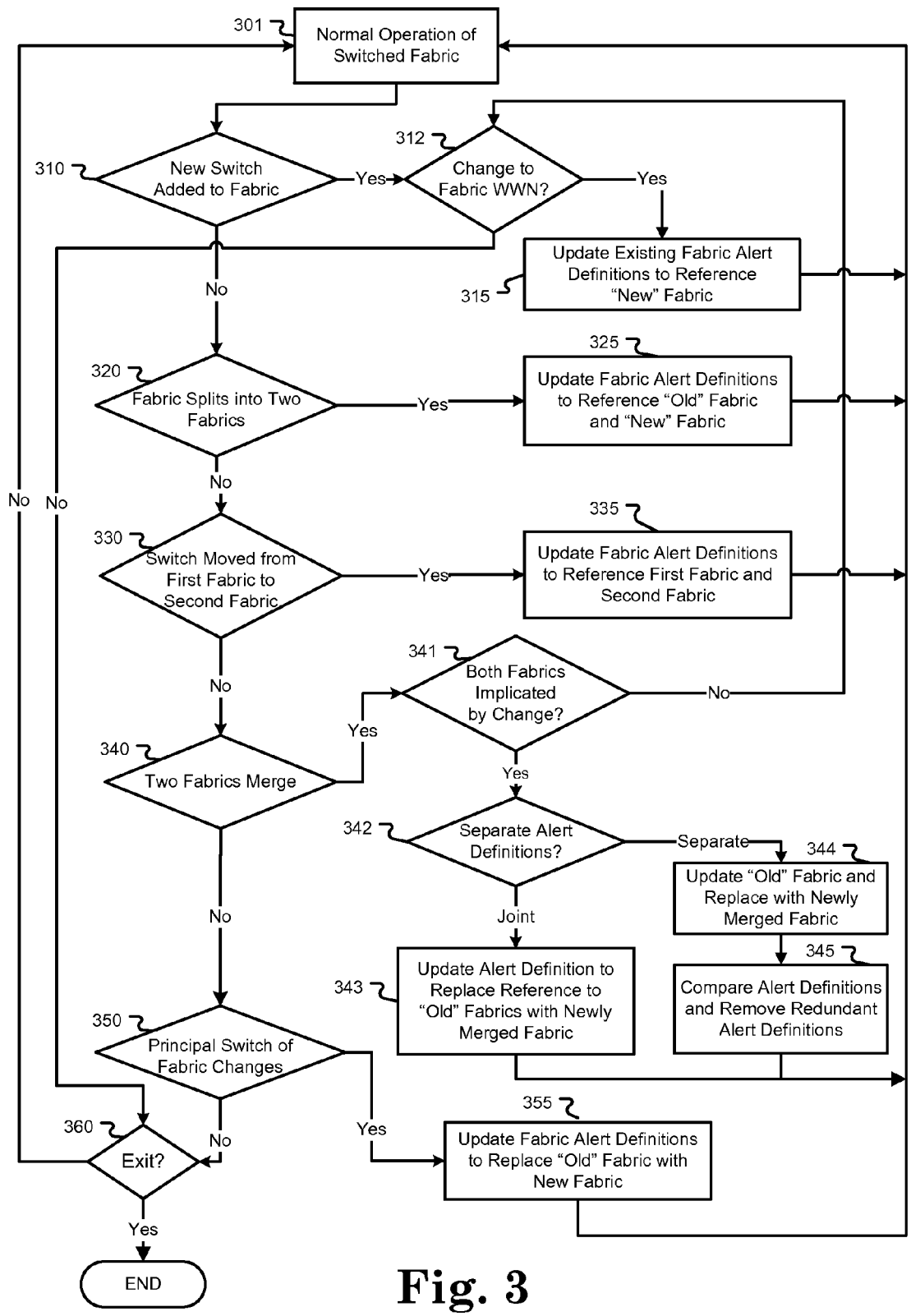
FIG. 3 depicts a flowchart depicting an operation for performing automatic updates to fabric alert definitions according to one embodiment of the present invention.

Once the changes to the fabric are detected with the storage management system with the discovery process or other similar discovery techniques as suggested above, the storage management system can operate to respond to update the fabric alert definitions. FIG. 3 provides a flowchart view of an operation initiated by the storage management system for performing automatic updates to fabric alert definitions according to one embodiment of the present invention.

To illustrate the most common types of fabric alert definition changes that may be required, this flowchart depicts five scenarios which require alert definition updates. Step 301 demonstrates the starting point of the update operation, starting from normal operation of a switch fabric. As the fabric changes are detected in the five scenarios, the storage management system initiates the appropriate response to update and remove alert definitions.

Some of the following scenarios are suggested in U.S. patent application Ser. No. 11/780,280, entitled "AUTOMATICALLY ADJUSTED SCHEDULED INVENTORY OF SWITCHED FABRICS," filed Jul. 19, 2007, which is incorporated by reference herein in its entirety. Application Ser. No. 11/780,280, however, generally discloses operations for dynamically updating fabric probe (inventory collection) definitions after a fabric merge, segmentation, or principal switch change, and does not directly address operations for updating fabric alerts or fabric alert definitions.

Scenario 1: Fabric WWN Changes

Scenario 1 involves the case where a new switch is added to a fabric and changes the fabric WWN from an old switch to a new switch. This scenario is depicted in FIG. 3 as decision steps 310 and 312. If one or more new switches are added to the fabric but the fabric WWN does not change to a new switch, then the addition of a new switch will have no effect on existing fabric alert definitions.

Upon detection of the new switch and the change to the fabric WWN as in decision steps 310 and 312, any existing fabric alert definitions containing the old WWN are updated with the new WWN and are updated to use the "new" fabric as in step 315. Restated, any existing fabric alert definitions with the old WWN are updated to use the new WWN.

Scenario 2: Fabric Segmentation

Scenario 2 involves the case where a fabric splits or is segmented into at least two fabrics. This scenario is depicted in FIG. 3 as decision step 320. Upon detection of this scenario, the existing fabric alert definitions are updated to include references to both the "old" fabric (i.e., the fabric WWN of the pre-split fabric assuming it retained the same principal switch after the split) and the "new" fabric (i.e., the fabric WWN of the new fabric originating from the split) as in step 325.

Scenario 3: Fabric Switch Movement

Scenario 3 involves the case where a switch is moved from one fabric to another fabric. This scenario is depicted in FIG. 3 as decision step 330. However, this is considered to be an "edge condition" that does not occur often. This scenario only occurs when a physical change is made to the network topology, and cannot happen from an inter-switch link going down or some other automatic failure within the network.

Upon detection of the fabric switch movement, any existing fabric alert definitions are updated to reference both the "old" fabric (the first fabric) and the fabric that the switch was added to (the second fabric), as in step 335.

Scenario 4: Fabric Merger

In scenario 4, a fabric merger between two fabrics occurs. A fabric merger scenario may implicate cases where one or both of the pre-merger fabrics are used in existing alert definitions.

If only one of the fabrics is used in existing fabric alert definitions as in decision step 341, and the merger causes the WWN of only one fabric to change, then this results in the same WWN change as described as a result of adding a new switch in Scenario 1 (steps 312 and 315, involving updating any existing fabric alert definitions to reference the new WWN of the fabric). Thus, any existing fabric alert definitions are easily updated as applicable to reference the WWN of the merged fabric.

The more complex case occurs where both fabrics are used in existing alert definitions as in decision step 341. The next consideration is whether both fabrics are listed in alert definitions either jointly or separately as depicted in decision step 342. In other words, a fabric merger may affect cases when both pre-merger fabrics are listed in one fabric alert definition (the joint case), or when both pre-merger fabrics are listed in separate fabric alert definitions (the separate case). These two possibilities are handled as follows:

(a) Joint case. Two pre-merger fabrics are listed together in one fabric alert definition, and then the fabrics merge. As shown in step 343, the alert definition is updated to replace any references to the "old" fabrics in the alert definition with a reference to the newly merged fabric WWN.

(b) Separate case. Two pre-merger fabrics are listed in two separate fabric alert definitions, and then the fabrics merge. As shown in step 344, each alert definition is to replace the "old" fabric WWN with the newly merged fabric WWN. Finally, the alert definitions are logically compared as in step 345, and if any two alert definitions are identified as redundant, the user is provided with a warning. In further embodiments, the redundant alert definitions may be removed automatically.

As an illustrative example, two fabrics may be each included as the sole fabric in their own fabric alert definition. If this is the case, and the two fabrics are merged, then the fabric alert definitions will be redundant after the merge, as depicted in FIG. 4A. In FIG. 4A, two alert definitions are established for the 'AAAA and 'AEEE fabrics as in 411. The merger of the 'AAAA and 'AEEE fabric occurs in 421, and the 'AAAA fabric becomes the principal switch in the merged fabric. 431 shows the state of the alert definition references after an update of the principal switch. In 441, the fabric alert definitions are logically compared. Fabric alert definition 1 is identified as being identical to fabric alert definition 2. The user may be given a warning that redundant fabric alert definitions exist. Optionally, one of the redundant fabric alert definitions is automatically (or manually) removed. This results in only one alert definition surviving, that to fabric 'AAAA as in 451.

Alternately, as another example, two fabrics may be each included as one of a set of fabrics in fabric alert definitions. If this is the case, and the two fabrics are merged, then the fabric alert definitions will not be completely redundant after the merge, but two fabric alert definitions will contain the same fabric, as illustrated in FIG. 4B. As shown, two alert definitions are defined, with each containing two different fabrics as in 412. Fabric 'AAAA merges with Fabric 'AEEE as in 422. Switch 'AEEE is the principal switch in the merged fabric, resulting in the alert definitions of 432. Next, in 442 the fabric alert definitions are logically compared. Fabric alert definition 1 and fabric alert definition 2 are identified as redundantly containing 'AEEE. The user may be given a warning that fabric 'AEEE exists redundantly in fabric alert definition 1 and fabric alert definition 2. Optionally, one of the redundant fabric alert definitions is updated automatically (or manually) to remove this fabric. This results in a reduction from four to three fabrics listed in the alert definitions as in 452.

As a final alternative example, one fabric may be the sole fabric in a fabric alert definition, and another fabric may be one of a set of fabrics in another fabric alert definition. If this is the case, and the two fabrics are merged, then the fabric alert definitions will not be completely redundant after the merge. Rather, two fabric alert definitions will contain the same fabric, and one of the fabric alert definitions can be removed, as illustrated in FIG. 4C. As shown, two fabrics are defined in alert definition 1 and one fabric is defined in alert definition 2 as in 413. Fabric 'AAAA merges with Fabric 'AEEE as in 423. 'AEEE is the principal switch in the merged fabric. As shown in 433, redundant alert definitions exist. In 443, the fabric alert definitions are logically compared. Fabric alert definition 1 and fabric alert definition 2 are identified as redundantly containing 'AEEE. The user may be given a warning that fabric 'AEEE exists redundantly in the two alert definitions. Optionally, one of the redundant fabric alert definitions is updated automatically (or manually) to remove this fabric. In this case, Fabric 'AEEE is removed from the fabric alert definition 2 (and no longer has any fabrics, so this definition is removed automatically) as in 453.

In summary, upon merger of two fabrics, the following steps are taken in order to ensure the accuracy of the post-merger fabric alert definitions:

1. Check that the application allows fabric alert definitions to be defined with a scoping fabric or scoping set of fabrics.
2. Configure alert definitions for more than one fabric.
3. Segment a fabric, merge fabrics, and/or change the principal switch of a fabric.
4. Check that the fabric alert definitions have been updated.

Scenario 5: Fabric Principal Switch Changes

In Scenario 5, the principal switch of a fabric is changed, as depicted in decision step 350 of FIG. 3. Existing fabric alert definitions are updated to remove any "old" fabric references and to add "new" fabric references to the alert definition as in 355. Therefore, any existing fabric alert definitions referencing the previous principal switch WWN will be updated with the new principal switch WWN.

As will be appreciated by one skilled in the art, additional detection and response steps may be applied to a storage management system to handle required changes for fabric alert definitions and other system attributes scoped by fabric. The precise order and time for performing the detection of fabric changes may be varied according to system requirements and capabilities, and the particular settings provided by the storage management system administrator. Further, many portions of the detection and updating steps described are applicable to other types of non-fibre channel network technologies, particularly those which use a similar structure or naming scheme.

As will also be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although various representative embodiments of this invention have been described above with a certain degree of particularity, those skilled in the art could make numerous alterations to the disclosed embodiments without departing from the spirit or scope of the inventive subject matter set forth in the specification and claims.

What is claimed is:

1. A method for performing automatic updates to fabric alert definitions, comprising:
    monitoring fabric alert definitions defined within a storage management system, the storage management system configured to manage a storage area network having a plurality of switches and a plurality of fabrics, and the fabric alert definitions defining alert conditions within the storage management system relevant to events occurring within one or more of the plurality of fabrics;
    storing relationships between each fabric and each switch corresponding to each fabric existing within the storage area network;
    detecting one or more changes to the plurality of fabrics by discovering current relationships between each fabric and each switch corresponding to each fabric within the storage area network and comparing the current relationships against the stored relationships; and
    by a processor, automatically modifying fabric alert definitions having a reference to changed fabrics responsive to detection of the one or more changes to the plurality of fabrics.

2. The method of claim 1, wherein the storage area network is selected from the group consisting of a fibre channel network, an iSCSI network, a serial attached SCSI network, and a Fibre Channel over Ethernet (FCoE) network.

3. The method of claim 1, wherein the current relationships between each fabric and each switch are discovered responsive to changes occurring upon the plurality of switches.

4. The method of claim 1, wherein one of the changes is an addition of a new switch to a changed fabric and a fabric identifier change of the changed fabric from a first identifier to a second identifier, and wherein automatically modifying the fabric alert definitions includes replacing fabric alert definitions referencing the first identifier with the second identifier.

5. The method of claim 1, wherein one of the changes is a segmentation of a fabric into a first fabric and a second fabric, and wherein automatically modifying fabric alert definitions includes updating the fabric alert definitions to reference both of the first fabric and the second fabric.

6. The method of claim 1, wherein one of the changes is movement of a switch from a first fabric to a second fabric, and wherein automatically modifying fabric alert definitions includes updating the fabric alert definitions to reference both of the first fabric and the second fabric.

7. The method of claim 1, wherein one of the changes is merger of a first fabric into a second fabric, and wherein one or more fabric alert definitions only reference the first fabric, and wherein automatically modifying fabric alert definitions includes updating references to the first fabric with references to the second fabric.

8. The method of claim 1, wherein one of the changes is merger of a first fabric into a second fabric, and wherein the fabrics are listed jointly in one or more fabric alert definitions, and wherein automatically modifying fabric alert definitions includes updating references to the first fabric with references to the second fabric.

9. The method of claim 1, wherein one of the changes is a merger of a first fabric into a second fabric, and wherein the fabrics are listed separately in one or more fabric alert definitions, and wherein automatically modifying fabric alert definitions includes updating references to the first fabric with references to the second fabric and removing redundant fabric alert definitions.

10. The method of claim 1, wherein one of the changes is a principal switch change of a fabric from a previous principal switch to a new principal switch, and wherein automatically modifying fabric alert definitions includes replacing references to the previous principal switch with references to the new principal switch.

11. A storage management system, comprising:
a processor;
a memory unit storing instructions operable with the processor for performing automatic updates to fabric alert definitions within the storage management system, the instructions being executed for:
monitoring fabric alert definitions defined within a storage management system, the storage management system configured to manage a storage area network having a plurality of switches and a plurality of fabrics, and the fabric alert definitions defining alert conditions within the storage management system relevant to events occurring within one or more of the plurality of fabrics;
storing relationships between each fabric and each switch corresponding to each fabric existing within the storage area network;
detecting one or more changes to the plurality of fabrics by discovering current relationships between each fabric and each switch corresponding to each fabric within the storage area network and comparing the current relationships against the stored relationships; and
automatically modifying fabric alert definitions having a reference to changed fabrics responsive to detection of the one or more changes to the plurality of fabrics.

12. The system of claim 11, wherein the storage area network is selected from the group consisting of a fibre channel network, an iSCSI network, a serial attached SCSI network, and a Fibre Channel over Ethernet (FCoE) network.

13. The system of claim 11, wherein the current relationships between each fabric and each switch are discovered responsive to changes occurring upon the plurality of switches.

14. The system of claim 11, wherein one of the changes is an addition of a new switch to a changed fabric and a fabric identifier change of the changed fabric from a first identifier to a second identifier, and wherein automatically modifying the fabric alert definitions includes replacing fabric alert definitions referencing the first identifier with the second identifier.

15. The system of claim 11, wherein one of the changes is a segmentation of a fabric into a first fabric and a second fabric, and wherein automatically modifying fabric alert definitions includes updating the fabric alert definitions to reference the first fabric and the second fabric.

16. The system of claim 11, wherein one of the changes is movement of a switch from a first fabric to a second fabric, and wherein automatically modifying fabric alert definitions includes updating the fabric alert definitions to reference both of the first fabric and the second fabric.

17. The system of claim 11, wherein one of the changes is merger of a first fabric into a second fabric, and wherein one or more fabric alert definitions only reference the first fabric, and wherein automatically modifying the one or more fabric alert definitions includes updating references to the first fabric with references to the second fabric.

18. The system of claim 11, wherein one of the changes is merger of a first fabric into a second fabric, and wherein the fabrics are listed jointly in one or more fabric alert definitions, and wherein automatically modifying fabric alert definitions includes updating references to the first fabric with references to the second fabric.

19. The system of claim 11, wherein one of the changes is a merger of a first fabric into a second fabric, and wherein the fabrics are listed separately in one or more fabric alert definitions, and wherein automatically modifying fabric alert definitions includes updating references to the first fabric with the second fabric and removing redundant fabric alert definitions.

20. The system of claim 11, wherein one of the changes is a principal switch change of a fabric from a previous principal switch to a new principal switch, and wherein automatically modifying fabric alert definitions includes replacing references to the previous principal switch with references to the new principal switch.

* * * * *